United States Patent [19]
Jones

[11] Patent Number: 5,920,289
[45] Date of Patent: Jul. 6, 1999

[54] HEATED SATELLITE REFLECTOR ASSEMBLY

[75] Inventor: Thaddeus M. Jones, Bremen, Ind.

[73] Assignee: MSX, Inc., South Bend, Ind.

[21] Appl. No.: 08/831,891

[22] Filed: Apr. 3, 1997

[51] Int. Cl.$^6$ .............................. H01Q 1/02; H01Q 1/12; E01F 9/00; G02B 5/08
[52] U.S. Cl. ........................ 343/704; 239/548; 250/33.65
[58] Field of Search ............................ 343/704; 239/548; H01Q 1/02, 1/12; E01F 9/00; G02B 5/08

[56] References Cited

U.S. PATENT DOCUMENTS

| | | | |
|---|---|---|---|
| 2,679,003 | 5/1954 | Dyke et al. ........................... | 250/33.65 |
| 3,674,215 | 7/1972 | Erdmann ................................. | 239/548 |
| 4,195,302 | 3/1980 | Leupelt .................................... | 343/704 |
| 4,259,671 | 3/1981 | Levin ....................................... | 343/704 |
| 4,368,471 | 1/1983 | Walton, Jr. ............................. | 343/704 |
| 4,536,765 | 8/1985 | Kaminski ................................ | 343/704 |
| 4,866,452 | 9/1989 | Barma et al. ........................... | 343/704 |
| 5,010,350 | 4/1991 | Lipkin et al. ........................... | 343/704 |
| 5,353,037 | 10/1994 | Jones ....................................... | 343/704 |

FOREIGN PATENT DOCUMENTS

| | | | |
|---|---|---|---|
| 645235 | 10/1950 | European Pat. Off. ................... | 38/40 |
| 57-207402 | 12/1982 | Japan .............................. | H01Q 1/02 |
| 57-208702 | 12/1982 | Japan .............................. | H01Q 1/02 |
| 60-214601 | 10/1985 | Japan .............................. | H01Q 1/02 |
| 1-254003 | 10/1989 | Japan .............................. | H01Q 1/12 |
| 402174401 | 7/1990 | Japan .............................. | H01Q 1/02 |
| 3-1601 | 1/1991 | Japan .............................. | H01Q 1/02 |
| 405112915 | 5/1993 | Japan .............................. | E01F 9/00 |

*Primary Examiner*—Frank G. Font
*Assistant Examiner*—Layla G. Lauchman
*Attorney, Agent, or Firm*—Taylor & Associates, P.C.

[57] ABSTRACT

The invention is directed to a reflector assembly in a satellite system including a reflector and a layer of insulation. The reflector includes a reflecting surface and a heater assembly embedded therein. The heater assembly is disposed on a side of the reflector opposite the reflecting surface. The layer of insulation covers the heater assembly and is disposed on a side of the heater assembly opposite the reflecting surface.

15 Claims, 2 Drawing Sheets

HEATED SATELLITE REFLECTOR ASSEMBLY

BACKGROUND OF THE INVENTION

1. Field of the invention

The present invention relates to satellite systems, and more particularly, reflectors for satellite systems.

2. Description of the related art

A reflector, commonly called a dish, is generally a parabolic section having a round or elliptical configuration. A reflector functions to gather radio or microwave frequency energy transmitted from the feedhorn or through the ambient environment from an external transmitter. The reflector can thus be used to receive and transmit signals to and from the satellite system. Reflectors are usually located outdoors, where snow and ice may collect on the receiving or concave side, degrading the performance of the reflector.

It is known to heat the front surface of a reflector with an embedded heater wire. The heater wire is held in place by heat staking the polyvinylchloride (PVC) wash coating a fiberglass cloth to an extruded PVC jacket that insulates the heater wire. A problem with this method is that the extruded PVC jacket thermally insulates the heater wire, inhibiting the heat from the wire from reaching the front surface of the reflector and thereby reducing the thermal efficiency of the heater wire. Another problem with embedding a heater wire within a reflector in a conventional manner is that heat is convected through the reflector to the back surface thereof. The heat is then radiated directly to the ambient environment, resulting in a further reduced thermal efficiency of the heater wire.

It is also known to mold heater wire into the back side of the reflector. That is, the heater wire is molded into the reflector closer to the back surface of the reflector than to the front surface. A problem with this method is that much heat is lost through the back surface of the reflector to the ambient environment.

Additionally, it is known to embed heating electrodes within a reflector. Both the reflecting surface and the electrodes are formed from electrically conductive materials, and it is thus necessary to provide a layer of insulating resin material between the reflecting surface and the electrodes. This insulating material actually decreases the thermal efficiency of the electrodes. Moreover, as with other known reflector assemblies employing embedded heaters, no insulation is provided on the back of the reflector to inhibit heat transfer to the ambient environment.

It is further known to provide a reflector assembly with a reflector which is spaced apart from and connected with a back cover. The reflector and back cover define an enclosed air chamber therebetween. A radiant heater is placed within the air chamber adjacent the back cover and radiates heat to the entire back surface of the reflector to melt or inhibit the accumulation of ice and snow on the reflector. Alternatively, forced hot air may be circulated within the air chamber between the reflector and back cover. The inside surface of the back cover may include a layer of fiberglass insulation and/or a reflective surface to radiate heat towards the reflector.

A reflector assembly used in conjunction with a back cover as described above uses convection or radiation to heat the back surface of the reflector. Such a heating technique is effective to heat the entire back surface of the reflector when desirable for certain applications, but is somewhat inefficient since the back surface of the reflector must be heated via convection or radiation and the heat then transferred to the front surface of the reflector via conduction. This means that the back surface of the reflector must actually be heated above a desired operating temperature on the front surface of the reflector due to thermal losses resulting from the conduction heat transfer. Moreover, the back cover is spaced apart from the reflector and increases the effective size of the reflector assembly, requiring additional space for operation and rendering handling more cumbersome.

Further, it is known to energize heater wire for a reflector with power line voltage, with 120 and 240 volts being common in the United States. A problem is that power line voltage varies widely through out the world. A different heater configuration is required to accommodate each different power line voltage.

What is needed in the art is an improved heater assembly which inhibits or melts ice accumulation on the front surface of a reflector using embedded heater wire, reduces the amount of heat lost through the back surface of the reflector, and accommodates a variety of power line voltages.

SUMMARY OF THE INVENTION

The present invention provides an insulated heater assembly which inhibits or melts ice accumulation on the front surface of a reflector using embedded heater wire.

The invention comprises, in one form thereof, a reflector assembly in a satellite system including a reflector and a layer of insulation. The reflector includes a reflecting surface and a heater assembly embedded therein. The heater assembly is disposed on a side of the reflector opposite the reflecting surface. The layer of insulation covers the heater assembly and is disposed on a side of the heater assembly opposite the reflecting surface.

An advantage of the present invention is that an extruded PVC jacket is not needed on the heater wire. Two layers of wide weave fiberglass cloth sandwich the heater wire and functionally replace the extruded PVC jacket. Additionally, this heater fabrication technique permits the heater assembly to conform to the exact shape of the reflector. This includes the circular or elliptical shape and the parabolic curvature of the reflector.

Another advantage is that less heat is lost through the back surface of the reflector. The heater wire is embedded just under the front surface of the reflector and is separated from the back surface of the reflector by a layer of thermal insulation. Placing the heater adjacent to the reflecting surface of the antenna dramatically reduces the heater power required. The layer of thermal insulation is in a honeycomb configuration, which, besides serving as an excellent thermal insulator and minimizing thermal losses from the rear of the reflector, provides a very strong, rigid, light antenna structure. The honeycomb is coated with a thermoset or thermoplastic material to protect it from moisture, mold, mildew and fungus.

The thermal insulation provided by the honeycomb material and mounting of the heater close to the reflecting surface dramatically reduces the power requirement for a given temperature rise over ambient. Reflectors heated from the back side of the reflector typically require a power density of 40 to 50 watts per square foot, but may require a higher power density, e.g., 80 to 120 watts per square foot. The present invention reduces the required power density per square foot for the same temperature rise. For example, the present invention may reduce the power density to about 14 watts per square foot, dependent upon the application, ambient conditions, etc. The lower power density not only reduces operating costs, but also the amount of heater wire that is required. Thus, this heating scheme costs less than commonly used technology.

Yet another advantage is that the heater may operate at either low voltage or high voltage. Operation at low voltage allows the heater to accommodate a variety of power line voltages by changing transformer taps. In addition, low voltage operation eliminates shock hazard and simplifies compliance with both domestic and foreign requirements.

BRIEF DESCRIPTION OF THE DRAWINGS

The above-mentioned and other features and advantages of this invention, and the manner of attaining them, will become more, apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
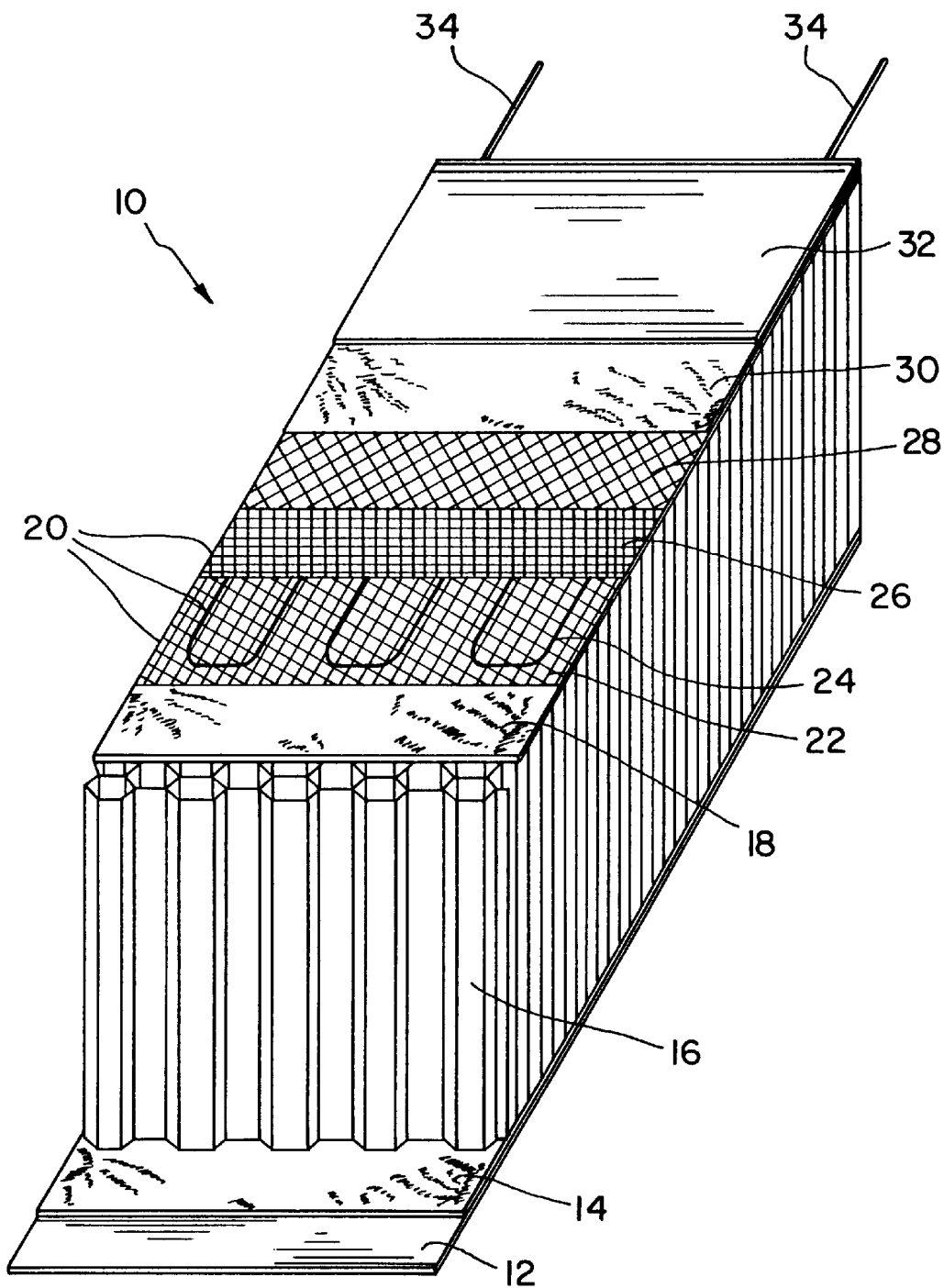
FIG. 1 is a perspective, fragmentary and layered view of one embodiment of a reflector assembly of the present invention.

Referring now to the drawings and particularly to FIG. 1, there is shown a reflector assembly 10 including a back surface 12, a first single layer of narrow weave fiberglass cloth 14, a layer of insulation 16, at least one layer of narrow weave fiberglass cloth 18, a heater assembly 20, an aluminum screen 28, a second single layer of narrow weave fiberglass cloth 30 and a front surface 32.

Figure 2:
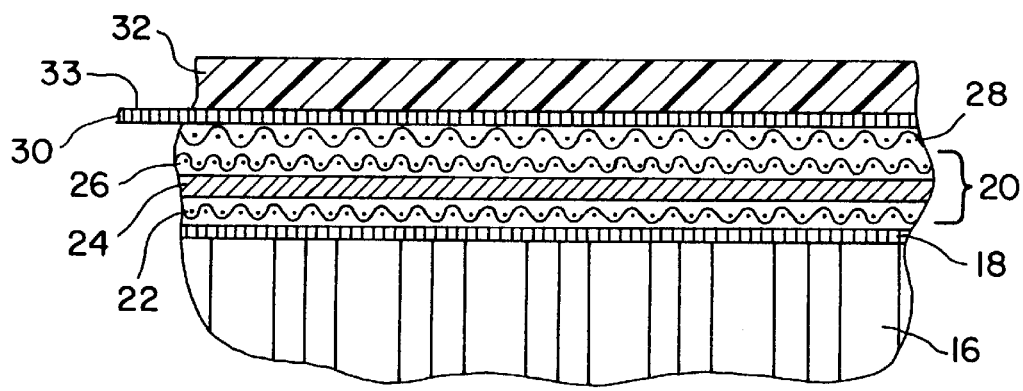
FIG. 2 is a side, fragmentary and sectioned view of the reflector assembly of FIG. 1.

As is apparent from FIGS. 1 and 2, reflector assembly 10 of the present invention is formed with a laminated construction including the plurality of layers of materials identified above. Each of the layers of material are bonded to each other in an intimate fashion as will be described hereinafter. The term "laminated" or other derivative spellings thereof, as used herein is intended to distinguish reflector assembly 10 from a satellite system including a back cover which is spaced apart from the reflector. Reflector assembly 10 of the present invention is of an integral, laminated construction which overcomes the problems associated with using a back cover as described above.

Front surface 32, narrow weave fiberglass cloth 30, heater assembly 20 and narrow weave fiberglass cloth 18 define a reflector which functions to reflect radio wave or microwave frequency energy when the satellite system is used as a receiver and/or transmitter.

Front surface 32 and back surface 12 are composed of a plastic such as polyester resin which can include chopped fiberglass. All layers, including front surface 32 and back surface 12, are shown as planar in FIGS. 1 and 2 for purposes of illustration. However, it is to be understood that all layers are formed with a desired curvature for the specific application for which reflector assembly 10 is to be utilized. For example, front surface 32 may have a concave parabolic curvature with a circular, elliptical or rectangular shaped perimeter. All layers behind front surface 32, through back surface 12, may thus also have a parabolic curvature to conform to front surface 32.

Heater assembly 20 includes insulated resistance heater wire 24 sandwiched between two layers of wide weave fiberglass cloth 22, 26 for mechanical protection, insulation and support during installation. Wide weave fiberglass cloths 22 and 26 have a mesh size of approximately ⅛ inch in the embodiment shown, but may vary from a ¹⁄₁₆ inch mesh to a ⅜ inch mesh. Resistance heater wire 24 may be constructed from any suitable material such as copper, stainless steel, or alloyed metals. The insulation on heater wire 24 may be washed (e.g., low voltage applications) or extruded (e.g., high voltage applications).

Layers of fiberglass cloth 22 and 26 are coated with a thin polyvinylchloride (PVC) wash. The PVC has a melting point substantially below that of the insulation coating on copper wire 24. Thus, the front layer of fiberglass cloth 26 and the back layer of fiberglass cloth 22 can be heat staked to each other and to heater wire 24 without damaging the insulation on heater wire 24. The heat staking serves to hold heater wire 24 in place. Other types of wash having a melting point below that of the insulation coating on copper wire 24 may also be used.

Configured as described above, heater assembly 20 easily conforms to the shape of any reflector in which it is embedded. Heater assembly 20 may be made in any desired shape and easily conformed to the curvature of any reflector during the embedding process. Heater assembly 20 is therefore adaptable for use with any size or shape reflector.

Heater wire 24, in the embodiment shown in FIG. 1, is disposed between fiberglass cloths 22 and 26 in a zig-zag manner with successive rows connected by short segments on the ends of the rows. However, it is to be understood that heater wire 30 can be disposed between fiberglass cloths 22 and 26 in any of a number of patterns. Additionally, heater wire 24 can be folded over in two equal halves before being laid on fiberglass cloth 22. Current then flows in opposite directions in adjacent halves of wire 24. The magnetic fields from opposite halves of wire 24 tend to cancel each other, thereby reducing the inductance otherwise created by running heater wire 24 in one direction. Inductance reduces the power factor, thus limiting the current available for heating. Opposite halves of wire 24 can also be twisted around each other in a spiral pattern, further reducing inductance and mechanically linking together opposite halves of wire 24.

Narrow weave fiberglass cloths 18 and 30 are disposed on opposite sides of heater assembly 20 and aluminum screen 28. Fiberglass cloths 18 and 30 have a substantially closed mesh in which the fibers are disposed adjacent to each other while still allowing the PVC wash to penetrate therethrough. However, fiberglass cloths 18 and 30 may have a more open mesh size.

Aluminum screen 28 is positioned immediately beneath the layer of narrow weave fiberglass cloth 30 and front surface 32. Aluminum screen 28 defines a reflecting surface 33 (FIG. 2) adjacent to front surface 32 which reflects the radio or microwave frequency energy. Heater assembly 20 is mounted just behind aluminum screen 28. Thus, embedded heater assembly 20 is positioned close to front surface 32, e.g., a few hundredths of an inch behind front surface 32.

Layer of insulation 16 is configured in a honeycomb structure. Honeycomb structure 16 is manufactured from a fiber material such as cardboard in the embodiment shown, but may be made from any suitable material, e.g., plastic or metal. The fiber material is coated with a thermoset or thermoplastic material to protect it from moisture, mold, mildew and fungus. The closed cells of honeycomb structure 16 contain a large percentage of air, and honeycomb structure 16 is an excellent thermal insulator, substantially reducing heat loss from back surface 12 of reflector assembly 10. Honeycomb 16 has a dual functionality in that it also provides a very strong, rigid, light antenna structural support.

In the embodiment shown, the layer of insulation is a honeycomb structure 16. However, it is also to be understood that the layer of insulation disposed on the back side of heater assembly 20 may be in the form of other insulators which insulate the back of reflector assembly 10, and thereby improve the thermal efficiency of reflector assembly 10. For example, the. layer of insulation 16 may be configured from foam plastic, polyurethane foam, silica aero gel, or other types of close cell insulated materials. Depending upon the particular type of insulating material utilized, the layer of insulation 16 may be sprayed on, molded, laminated, etc., to the back side of heater assembly 20.

Figure 3:
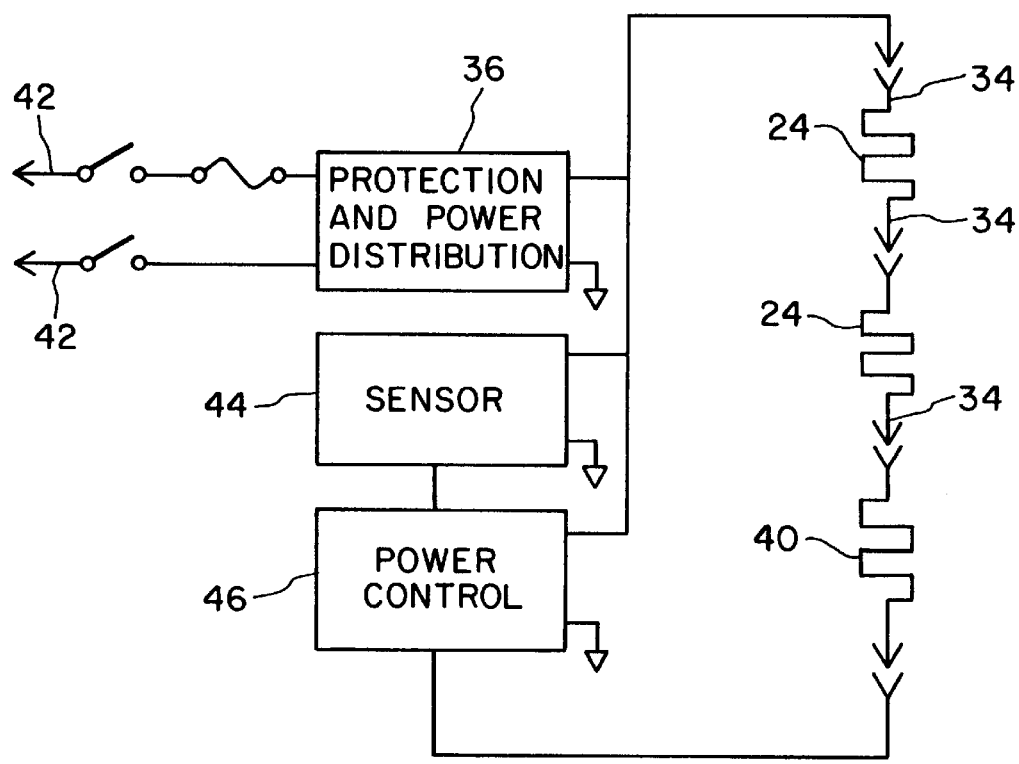
FIG. 3 is an electrical schematic diagram of an embodiment of a reflector deicer of the present invention.

Protection and power distribution module 36 (FIG. 3), supplying 24 volts alternating current at 8 amperes in the embodiment shown, energizes two reflector heater wires 24 and a feedhorn heater wire 40 in series. Series connection of the heater wires 24 and feedhorn heater wire 40 simplifies the installation. Each of the two reflector heater wires 24 heats a bottom quadrant of the reflector assembly 10 as only the bottom half of the reflector assembly 10 is typically heated. Heater wire leads 34 (FIGS. 1 and 3) connect heater wires 24 with protection and power distribution module 36. Protection and power distribution module 36 uses a transformer tap, also called a dropping transformer, to convert a higher power line voltage on conductors 42 (e.g., 100 volts or greater) to 24 volts used by heater wires 24 and feedhorn heater wire 40. Protection and power distribution module 36 allows the same heater configuration to be used with any power line voltage on conductors 42. Sensor 44 senses an accumulation of ice or snow on reflector assembly 10; and power control 46 controls the operation of heater wires 24 and feedhorn heater wire 40 dependent upon a signal received from sensor 44.

During manufacture, narrow weave fiberglass cloth 30, aluminum screen 28, heater assembly 20 and one or more layers of narrow weave fiberglass cloth 18 are placed within a mold (not shown). A polyester resin is then placed within the mold. Thereafter, honeycomb structure 16, a layer of fiberglass cloth 14 and polyester resin 12 are added to the mold. Reflector assembly 10 is then cured at room temperature. An air bladder (not shown) may be affixed to the mold to provide pressure during the curing process.

Heater assembly 20 is particularly defined above for use in low voltage application. However, it is to be understood that heater assembly 20 may also be used in high voltage applications if desired.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A reflector assembly in a satellite system, said reflector assembly being of laminated construction with a plurality of layers bonded to each other, said layers comprising:

a reflector including a reflecting surface;

a heater assembly disposed on a side of said reflector opposite said reflecting surface; and a layer of thermal insulation covering said heater assembly, said layer of thermal insulation disposed on a side of said heater assembly opposite said reflecting surface.

2. The reflector assembly of claim 1, wherein said layer of insulation has a honeycomb structure.

3. A reflector assembly in a satellite system, said reflector assembly being of laminated construction with a plurality of layers bonded to each other, said layers comprising:

a reflector including a reflecting surface;

a heater assembly disposed on a side of said reflector opposite said reflecting surface; and a layer of insulation covering said heater assembly, said layer of insulation disposed on a side of said heater assembly opposite said reflecting surface, said layer of insulation having a honeycomb structure, said insulation being comprised of a fiber material coated with one of a thermoset material and thermoplastic material.

4. A reflector assembly in a satellite system, said reflector assembly being of laminated construction with a plurality of layers bonded to each other, said layers comprising:

a reflector including a reflecting surface;

a heater assembly disposed on a side of said reflector opposite said reflecting surface; and a layer of insulation covering said heater assembly, said layer of insulation disposed on a side of said heater assembly opposite said reflecting surface, said layer of insulation defining a means for thermally insulating said heater assembly and a means for structurally supporting said reflector.

5. A reflector assembly in a satellite system, said reflector assembly being of laminated construction with a plurality of lavers bonded to each other, said layers comprising:

a reflector including a reflecting surface;

a heater assembly disposed on a side of said reflector opposite said reflecting surface, said heater assembly comprising a heater wire disposed between two layers of electrically insulating cloth; and a layer of insulation covering said heater assembly, said layer of insulation disposed on a side of said heater assembly opposite said reflecting surface.

6. The reflector assembly of claim 5, wherein said heater wire comprises copper wire.

7. The reflector assembly of claim 5, wherein said two layers of cloth are attached to each other to hold said heater wire stationary between said two layers of cloth.

8. The reflector assembly of claim 6, wherein said two layers of cloth comprise two layers of wide weave fiberglass cloth.

9. The reflector assembly of claim 5, further comprising a polyvinylchloride wash coating said two layers of cloth.

10. The reflector assembly of claim 5, wherein said layers of cloth are heat staked to each other.

11. The reflector assembly of claim 5, further comprising at least one layer of narrow weave fiberglass cloth disposed between said heater assembly and said insulation layer.

12. The reflector assembly of claim 10, further comprising a single layer of narrow weave fiberglass cloth disposed adjacent to said layer of insulation on a side of said layer of insulation opposite said heater assembly.

13. The reflector assembly of claim 4, wherein said reflector comprises an aluminum screen defining said reflecting surface.

14. The reflector assembly of claim 12, further comprising a layer of narrow weave fiberglass cloth disposed adjacent to said reflecting surface.

15. The reflector assembly of claim 1, wherein said layer of thermal insulation comprises a layer of fiber material.

\* \* \* \* \*